US008103895B2

(12) United States Patent
Hatano

(10) Patent No.: US 8,103,895 B2
(45) Date of Patent: Jan. 24, 2012

(54) INFORMATION PROCESSING APPARATUS AND WAKE-UP CONTROL METHOD

(75) Inventor: Ken Hatano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 318 days.

(21) Appl. No.: 12/464,625

(22) Filed: May 12, 2009

(65) Prior Publication Data
US 2009/0327769 A1 Dec. 31, 2009

(30) Foreign Application Priority Data

Jun. 30, 2008 (JP) ................................. 2008-170972

(51) Int. Cl.
G06F 1/00 (2006.01)
(52) U.S. Cl. ......... 713/324; 713/300; 713/310; 713/323
(58) Field of Classification Search .................. 713/300, 713/310, 323, 324
See application file for complete search history.

(56) References Cited

U.S. PATENT DOCUMENTS

| 6,052,793 | A  | * | 4/2000  | Mermelstein     | 713/340 |
|-----------|----|---|---------|-----------------|---------|
| 6,393,570 | B1 | * | 5/2002  | Henderson et al.| 713/310 |
| 6,427,182 | B1 |   | 7/2002  | Sugiura et al.  |         |
| 6,437,623 | B1 | * | 8/2002  | Hsu et al.      | 327/202 |
| 6,710,771 | B1 |   | 3/2004  | Yamaguchi et al.|         |
| 6,725,384 | B1 | * | 4/2004  | Lambino et al.  | 713/320 |
| 6,760,850 | B1 | * | 7/2004  | Atkinson et al. | 713/320 |
| 7,117,377 | B2 | * | 10/2006 | Hagiwara et al. | 713/300 |
| 7,502,635 | B1 |   | 3/2009  | Horikoshi et al.|         |
| 7,574,615 | B2 | * | 8/2009  | Weng et al.     | 713/320 |
| 2004/0003307 | A1 | * | 1/2004 | Tsuji           | 713/310 |
| 2004/0132502 | A1 |   | 7/2004 | Matsumura       |         |
| 2007/0133312 | A1 | * | 6/2007 | Roohparvar      | 365/189.02 |
| 2007/0150766 | A1 |   | 6/2007 | Kuwahara        |         |
| 2008/0098246 | A1 | * | 4/2008 | Kim             | 713/323 |

(Continued)

FOREIGN PATENT DOCUMENTS

JP   H04-123140   4/1992

(Continued)

OTHER PUBLICATIONS

Notification of Reasons of Rejection mailed by Japan Patent Office on Jul. 28, 2009 in the corresponding Japanese patent application No. 2008-170972 in 5 pages.

(Continued)

Primary Examiner — Thomas Lee
Assistant Examiner — Jaweed A Abbaszadeh
(74) Attorney, Agent, or Firm — Knobbe, Martens, Olson and Bear, LLP

(57) ABSTRACT

According to one embodiment, an information processing apparatus includes devices including functions of generating wake-up signals, a controller which returns the apparatus to the power-on status in response to wake-up signals, and a first nonvolatile memory which stores information indicating whether the functions are enabled. The devices initializes such that the function is enabled if the information of the first nonvolatile memory has indicated that the function has been enabled when the power supply is started. The controller includes a second nonvolatile memory which stores information indicating devices to which power should be continuously supplied in the power-off status. The controller starts the power supply to the devices indicated that the power supply should be continued by the information of the second nonvolatile memory when the power supply is started, and continues the power supply in the power-off status to devices indicated that the power supply should be continued.

2 Claims, 5 Drawing Sheets

U.S. PATENT DOCUMENTS

2009/0089605 A1* 4/2009 Westwick et al. ............. 713/340

FOREIGN PATENT DOCUMENTS

| JP | H11-353266 | 12/1999 |
|---|---|---|
| JP | 2000-003233 | 1/2000 |
| JP | 2000-003233 A | 1/2000 |
| JP | 2000-112583 | 4/2000 |
| JP | 2001-051756 | 2/2001 |
| JP | 2001-051756 A | 2/2001 |
| JP | 2002-351585 | 6/2002 |
| JP | 2003-195989 | 7/2003 |
| JP | 2007-172314 | 7/2007 |

OTHER PUBLICATIONS

Explanation of Non-English Language Reference(s).

* cited by examiner

INFORMATION PROCESSING APPARATUS AND WAKE-UP CONTROL METHOD

CROSS-REFERENCE TO RELATED APPLICATIONS

This application is based upon and claims the benefit of priority from Japanese Patent Application No. 2008-170972, filed Jun. 30, 2008, the entire contents of which are incorporated herein by reference.

BACKGROUND

1. Field

One embodiment of the invention relates to a wake-up control technique which is suitably applied to a battery-powered personal computer, etc., including a wake-up function of recovering from a power-off status to a power-on status in response to a wake-up signal.

2. Description of the Related Art

In recent years, a battery-powered and easily portable notebook personal computer has become widely used. To maximally secure an operation time period by a battery, a computer of this kind has been contrived so as to save power consumption.

As regards the most basic method for preventing useless power consumption, it is required for power of an unused computer to be frequently turned off. Various kinds of systems which automatically return from the power-off status to the power-on status and enable users to immediately start using the computers without operating power buttons have been proposed in consideration of usability (e.g., Jpn. Pat. Appln. KOKAI Publication No. 2000-3233).

A system which can return the notebook computer being in a display-unit-closed status from the power-off status to the power-on status, for example, only by operating an external mouse connected to a universal serial bus (USB) connector has been referred to as a wake-up function. If the computer does not have this wake-up function, since the computer cannot return from the power-off status to the power-on status without opening the display unit to operate the power button, this wake-up function produces a great effect.

It is required for the wake-up function in the aforementioned example to be configured so that the computer continues power supply to a USB controller which communicates with the external mouse connected to the USB connector also the computer is in a power-off status, and so that the USB controller generates a wake-up signal for operating the wake-up function when data has been received from the external mouse. This configuration is formed in accordance with an instruction from a basic input/output system (BIOS) to which a control tight is transferred from an operation system (OS) when the computer is brought into the power-off status.

Here, it is assumed that the computer is in the power-off status under a situation which enables again supplying the power supply after the power supply has completely shut off without an alternating-current adapter being connected and also with exhaustion or removing of a battery. In this case, since the computer is not configured for the wake-up function based on the instruction from the BIOS, even if the mouse is operated, the computer is not returned from the power-off status to the power-on status.

However, a user is not in a position to distinguish the difference in the two kinds of power-off statuses, a system capable of operating normally the wake-up function is strongly required also in the case assumed as mentioned above.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes devices including functions of generating wake-up signals, a controller which returns the apparatus to the power-on status in response to wake-up signals, and a first nonvolatile memory which stores information indicating whether or not the functions are enabled. The devices initializes such that the function is enabled if the information of the first nonvolatile memory has indicated that the function has been enabled when the power supply is started. The controller includes a second nonvolatile memory which stores information indicating devices to which power should be continuously supplied in the power-off status. The controller starts the power supply to the devices indicated that the power supply should be continued by the information of the second nonvolatile memory when the power supply is started, and continues the power supply in the power-off status to devices indicated that the power supply should be continued.

The configuration of an information processing apparatus of the embodiment of the invention will be described with reference to FIG. 1 and FIG. 2. The information processing apparatus of the embodiment is implemented, for example, as a notebook personal computer 10.

Figure 1:
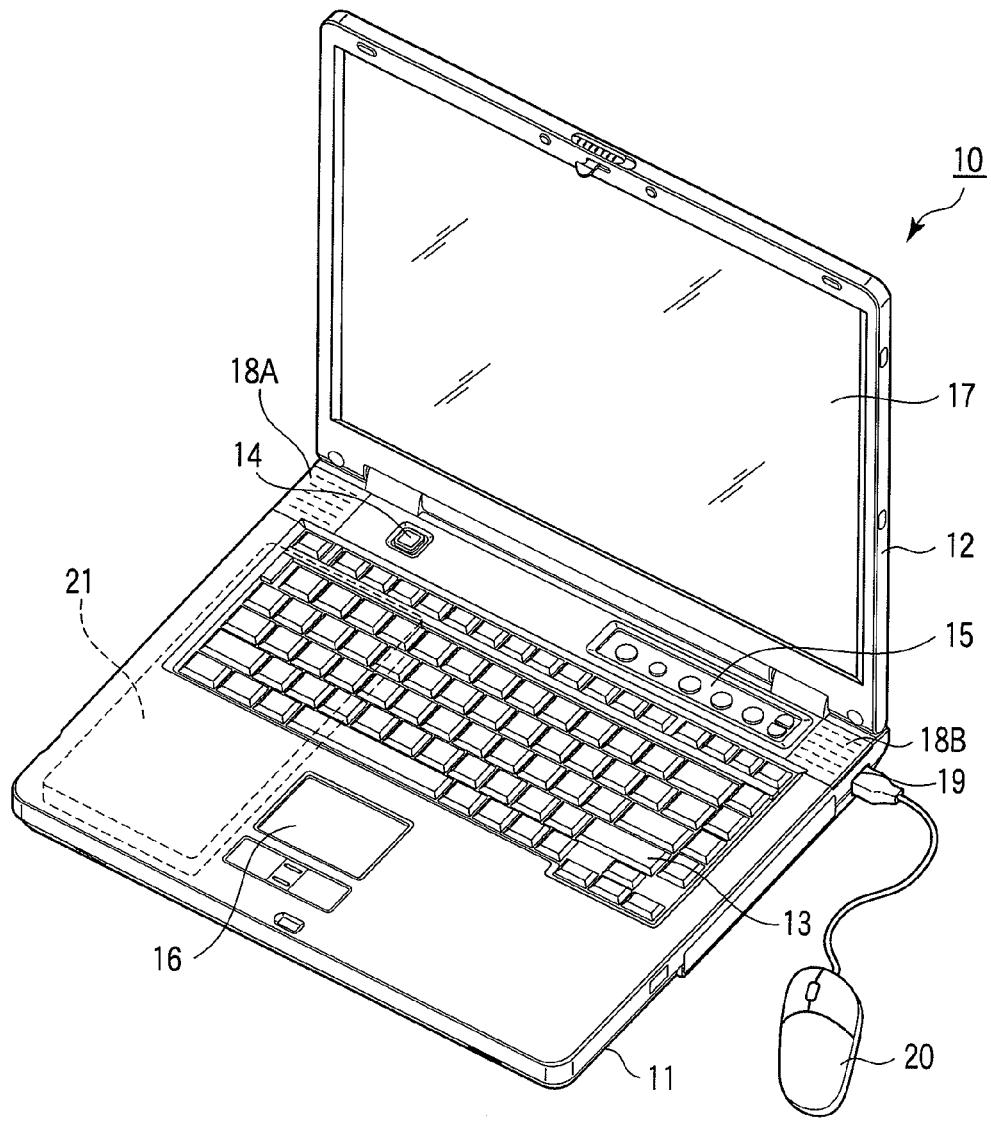
FIG. 1 is an exemplary perspective view depicting an exterior appearance of an information processing apparatus of an embodiment of the invention.

FIG. 1 shows a perspective view depicting a status in which a display unit of the computer 10 is opened. The computer 10 includes a computer main unit 11 and a display unit 12. The display unit 12 includes a display device composed of a liquid crystal display (LCD) 17.

The display unit 12 is freely turnably attached between an open position in which the upper face of the main unit 11 is exposed and a closed position in which the upper face of the main unit 11 is covered. The main body 11 has a thin box-shaped housing, and a keyboard 13, a power button 14 for powering on or off the computer 10, an input operation panel 15, a touchpad 16, loudspeakers 18A, 18B are disposed on the housing. The panel 15 is an input device for inputting an event corresponding to a pressed button, and has a button, for example, a button which quickly starts a television function of executing viewing and recording broadcast program data broadcasted by a television signals and a DVD function of reproducing video data recorded on a DVD.

A USB connector 19 to which various USB devices, such as a mouse 20, is disposed on the right side face of the main body 11. An alternating-current connector (not shown) to which the alternating-current adapter is connected is also disposed on the rear face of the main unit 11. A battery 21 is detachably attached inside the main unit 11.

The system configuration of the computer 10 will be described by referring to FIG. 2.

Figure 2:
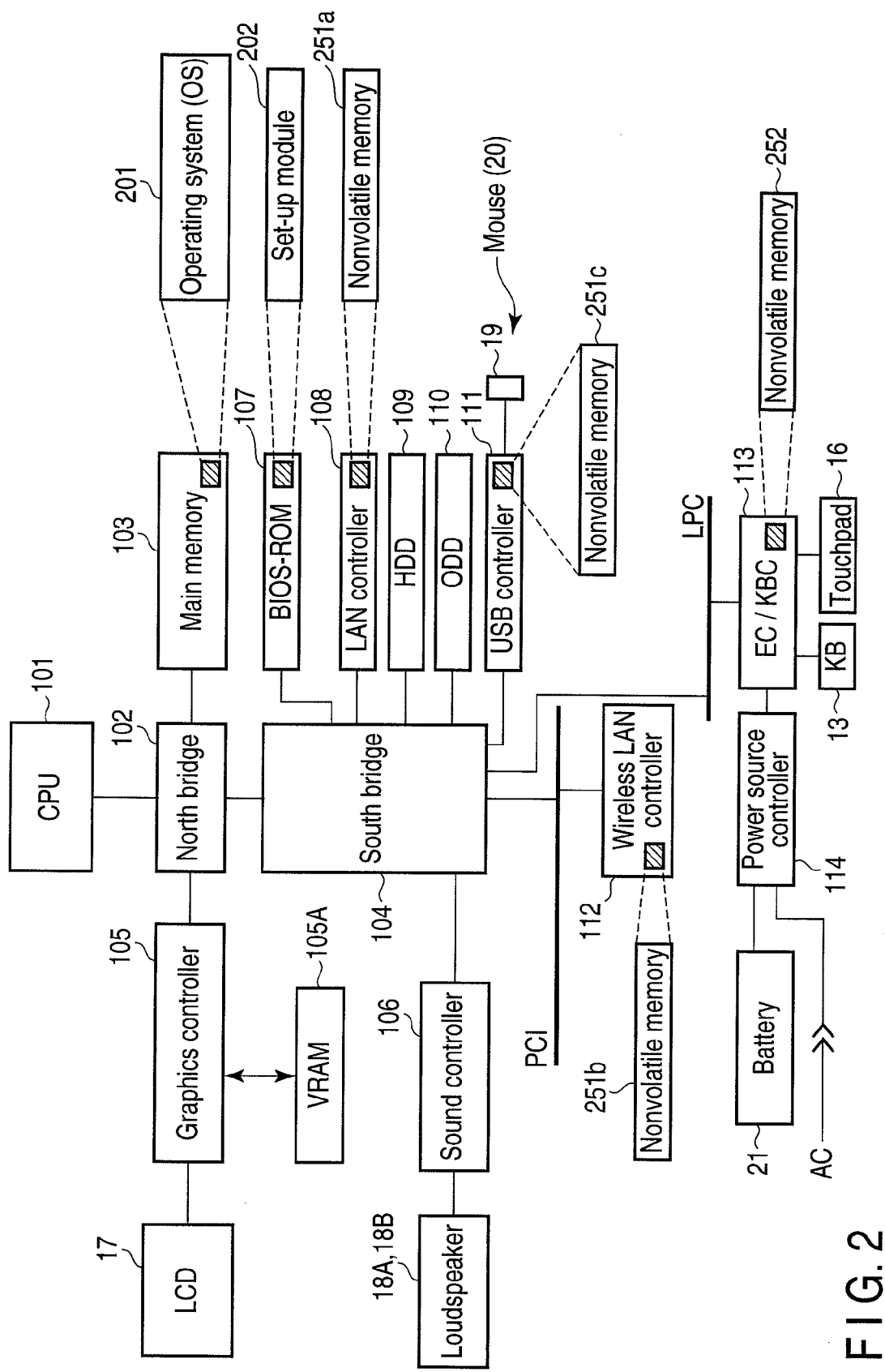
FIG. 2 is an exemplary block diagram depicting a system configuration of the information processing apparatus of the embodiment.

The computer 10, as shown in FIG. 2, includes a CPU 101, a north bridge 102, a main memory 103, a south bridge 104, a graphics controller 105, a video memory (VRAM) 105A, a sound controller 106, a BIOS-ROM 107, a LAN controller 108, a hard disk drive (HDD) 109, an optical-magnetic disc drive (ODD) 110, a USB controller 111, a wireless LAN controller 112, an embedded controller/keyboard controller (EC/KBC) 113, a power source controller 114, etc.

The CPU 101 is a processor controlling operations of the computer 10, and executes an operating system (OS) 201 and various application programs (including utility) to be operated under the OS 201 loaded from the HDD 10 onto the main memory 103. The CPU 101 also executes a BIOS stored in the BIOS-ROM 107. The BIOS is a program for controlling hardware. Hereinafter, the BIOS itself stored in the BIOS-ROM 107 may be referred to as a BIOS 107.

The north bridge 102 is a bridge device connecting between a local bus of the CPU 101 and a south bridge 104. The north bridge 102 includes a built-in memory controller for controlling accesses to the main memory 103. The north bridge 102 also includes a function of executing a communication with the controller 105 through a serial bus of a Peripheral Component Interconnect (PCI) EXPRESS standards.

The graphics controller 105 is a display controller which controls the LCD 17 to be used as the display monitor of the computer 10, and the display signal generated from the controller 105 is supplied to the LCD 17.

The south bridge 104 controls each device on a peripheral component interconnect (PCI) bus and each device of a low pin count (LPC). The south bridge 104 includes a built-in integrated drive electronics (IDE) controller for controlling the HDD 109 and ODD 110. Further, the south bridge 104 has a function of communicating with a sound controller 106, a LAN controller 108 and a USB controller 111.

The sound controller 106 is a sound source device, and outputs audio data to be reproduced to the loudspeakers 18A, 18B. The LAN controller 108 is a wired communication device executing a cable communication, for example, of Ethernet (registered trademark) Standards, and the wireless LAN controller 12 is a wireless communication device executing a wireless communication, for example, of IEEE 802.11 standards.

The EC/KBC 113 is a one-chip micro computer with an embedded controller for performing power management and a keyboard controller for controlling the keyboard (KB) 13 and the touchpad 16 integrated therein. The EC/KBC 113 cooperates with a power source controller 114 to execute control for supplying power from the battery 21 and from the alternating-current adapter to each unit. That is the EC/KBC 113 includes a function of powering on or powering off the computer 10 in response to an operation of the power button 14 by a user. The power from the battery 21 and the alternating-current adapter is supplied to the EC/KBC 113 and the power source controller 114 for executing power supply control, regardless of the power-on status or power-off status of the computer 10.

The computer 10 includes a so-called wake-up function which automatically returns to a power-on status when the LAN controller 108 or the wireless LAN controller 112 received communication data or the mouse 20 connected to the USB connector 19 is operated in a case where the computer is in the power-off status. The LAN controller 108, the wireless LAN controller 112 and the USB controller 111 (controlling the mouse 20 connected to the USB connector 19) each include a function of generating a wake-up signal when the aforementioned predetermined event occurs. The EC/KBC 113 includes a function of powering on the computer 10 in response to the occurrence of the wake-up signal as well as to the operation of the power button 14 by the user.

The BIOS 107 establishes whether or not each of the devices of the LAN controller 108, the wireless LAN controller 112 and the USB controller 111 makes the function of generating the wake-up signal effective. Generally, for shifting to a power-off status, when a control right is moved from the OS 201 of which the termination processing has been completed, the BIOS 107 issues a command instructing the fact, which the function of a device to generate the wake-up signal is intended to be effective, to the device. At the same time, the BIOS 107 informs to the EC/KBC 113 which device has been issued the command, that is, which device will be made effective for its function of generating the wake-up signal. The EC/KBC 113 continues the power supply to the informed device also in the power-off status of the computer 10.

In this way, generally, the wake-up function is achieved by setting work of the BIOS 107 in sifting to the power-off status. The BIOS 107 also includes a user interface function so that the user makes whether or not the function of generating the wake-up signal effective for each device.

Figure 3:
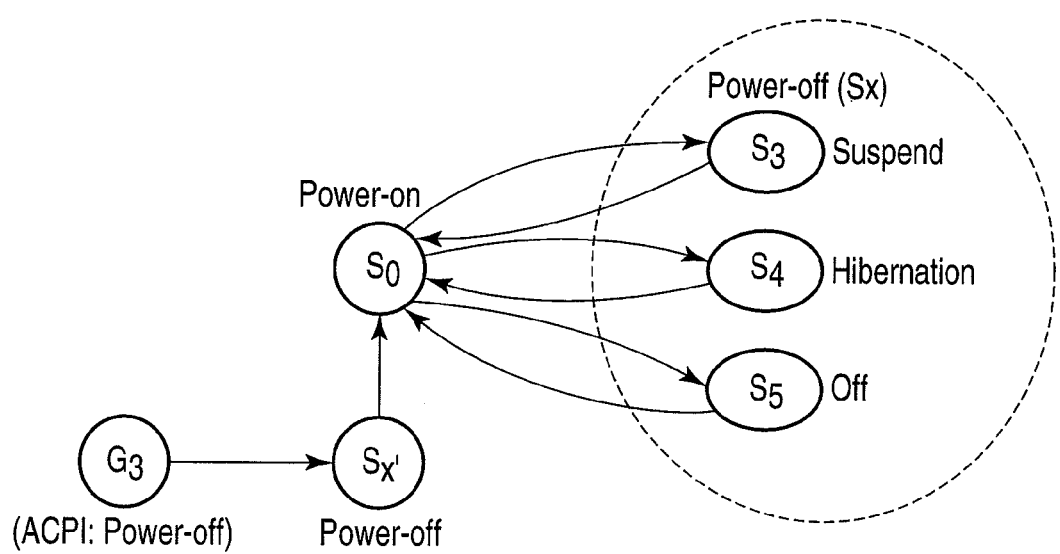
FIG. 3 is an exemplary view depicting a status transition of the information processing apparatus of the embodiment.

FIG. 3 shows a view depicting a status transition of the computer 10. The computer 10, as shown in FIG. 3, may come into four statuses: status $S_0$ of power-on status, status $S_3$ of a so-called suspended status in which the power is turned off while storing the previous status of the power-off in the main memory 103, status $S_4$ in a so-called hibernation status in which the power is turned off while storing the previous power-off status in the HDD 109, and status $S_5$ of a perfect power-off status. Statuses $S_3$-$S_5$ may be called status $S_X$ as the power-off status. As mentioned above, the computer 10 being in status $S_X$ may automatically return to status $S_0$ without operation of the power button 14.

Here, a case is assumed, which the alternating-current adapter has not been connected to the computer 10, and after the power supply is completely shut down because the battery 21 has been consumed or removed, the alternating-current adapter has been connected to the computer 10, or the battery 21 capable of supplying power has been mounted. The status of starting power supply is defined as a status $G_3$ in an advanced configuration and power interface (ACPI) specification. After returning to status $G_3$, the power-off status until the power button 14 is firstly operated is expressed as a fifth status $S_X'$. It is very hard for the user to distinguish differences between the statuses of the statuses $S_X'$, $S_X$. Since the BIOS 107 does not perform the setting work for the wake-up function in status $S_X'$, even if the predetermined events occur, the computer 10 does not automatically return to the power-on status generally.

Therefore, the embodiment devises so that the computer 10 can automatically return to the power-on status due to the wake-up function also in status $S_X'$, and hereinafter, this point will be described in detail.

To make the wake-up function automatically return status $S_X'$ to the power-on status, the computer 10 includes nonvolatile memories 251*a*, 251*b*, 251*c* for storing information indicating whether or not each device (wherein the LAN controller 108, wireless LAN controller 112 and USB controller 111) including a function of generating the wake-up signal enables or disables the function of generating the wake-up signal. When the power supply (through the EC/KBC 113, the power source controller 114) is started, the computer 10 executes initialization which includes a procedure to enable or disable the function of generating the wake-up signal on the basis of the information each stored in the nonvolatile memories 251*a*, 251*b*, 251*c*.

The EC/KBC 113 also includes a nonvolatile memory 252 which stores information indicating which device enables the function of generating the wake-up signal, and when the power supply (through the status $G_3$) is started, starts power supply to the device of which the function of generating the wake-up signal is enabled.

The BIOS 107 mounts a set-up module 202 for appropriately storing the information each stored in the nonvolatile memories 251*a*, 251*b*, 251*c* provided for each device and the nonvolatile memory 252 provided for the EC/KBC 113. The set-up module 202 includes a user interface function throughwhich the user makes whether the function of generating the wake-up signal enabled or disabled for each device, and informs the device designated by the user to enable its function of generating the wake-up signal to the EC/KBC 113. The EC/KBC 113 executes to store the information in the nonvolatile memory 252 on the basis of the report, and also issues a command so as to store the information indicating the device of which the function of generating the wake-up signal is enabled in each of the nonvolatile memories 251*a*, 251*b*, and 251*c* to the designated device.

For instance, it is assumed that the setting for automatically return the computer 10 from the power-off status to the power-on status is made when the mouse 20 connected to the USB connector 19 is operated by means of the set-up module 202. In this case, since the information, which generates the wake-up signal in accordance with the operation of the mouse 20 on the power-off status, is stored in the nonvolatile memory 251*c* of the USB controller 111, and the information, which immediately starts the power supply to the USB controller 111 in accordance with the start of the power supply, is stored in the nonvolatile memory 252 of the EC/KBC 113, when the alternating-current adapter is connected, and when the power supply is started due to the mounting of the battery 21, the power supply to the USB controller 11 is immediately started, and the USB controller 111 executes the initialization including the procedure which enables the function of generating the wake-up signal.

Thereby, when the mouse 20 is operated in status $S_X'$ after returning to status $G_3$, the USB controller 111 generates the wake-up signal, and when receiving this wake-up signal, the EC/KBC 113 returns the computer 10 to the power-on status.

Thus, user experience in which there is no difference between the statuses $S_X'$ and $S_X$ can be made the experience based on intuition.

While the nonvolatile memories 251*a*, 251*b*, 251*c* for storing the information indicating whether the function to gener-
ate the wake-up signal is enabled or disabled are disposed in the devices: LAN controller 108, wireless LAN controller 112 and USB controller 111, respectively, the devices may be disposed on the side of the computer 10 so that the devices can be accessed.

Figure 4:
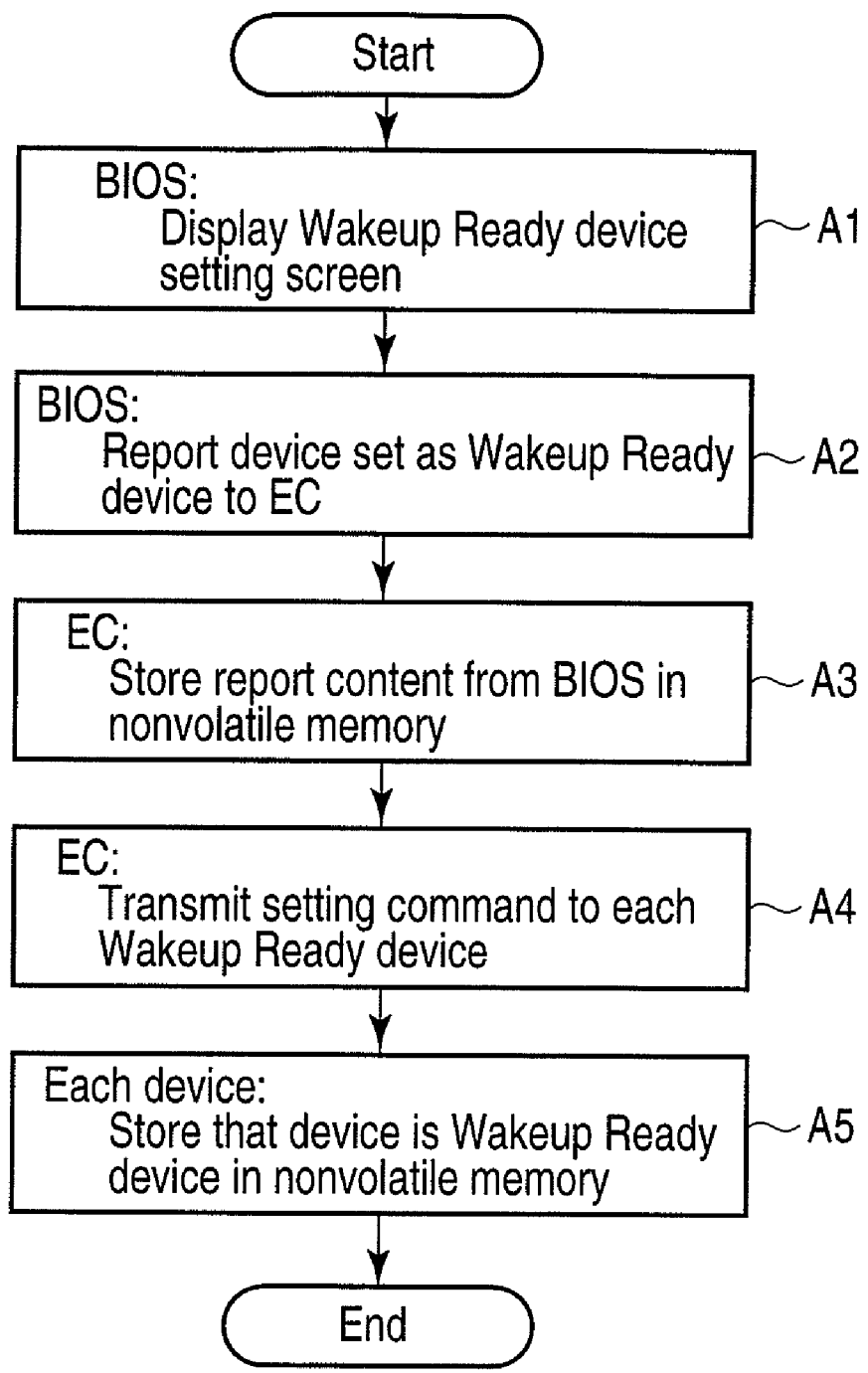
FIG. 4 is an exemplary flowchart depicting the flow in an environment setting for operating a wake-up function of the information processing apparatus of the embodiment.
Figure 5:
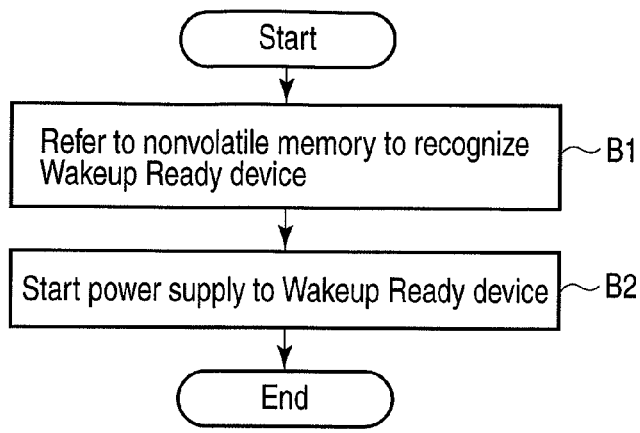
FIG. 5 is an exemplary flowchart depicting the flow of an operation concerning a wake-up function in returning to a $G_3$ status of an embedded controller/keyboard controller (EC/KBC) provided for the information processing apparatus of the embodiment.
Figure 6:
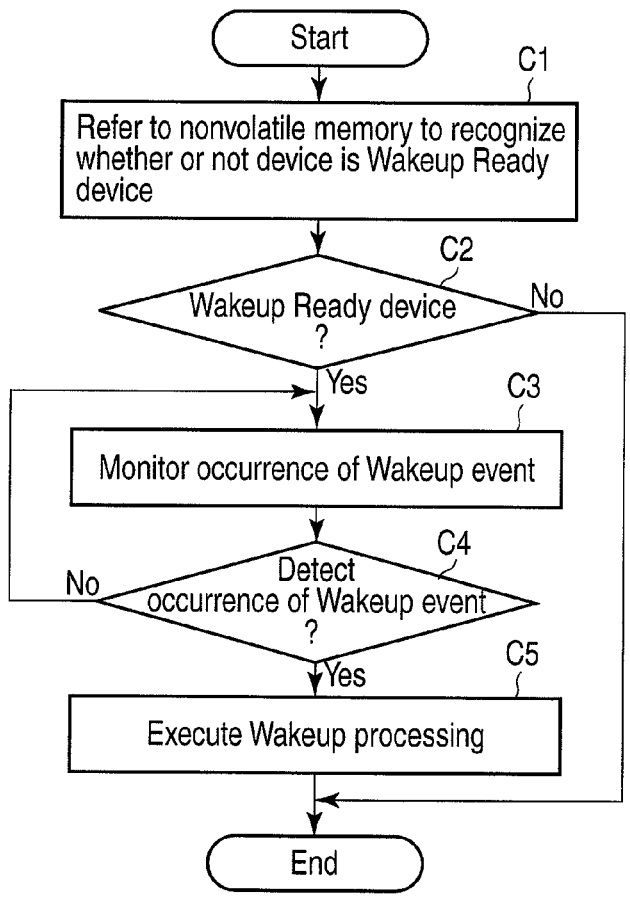
FIG. 6 is an exemplary flowchart depicting the flow of an operation concerning a wake-up function in starting power supply to each device provided for the information processing apparatus of the embodiment.

The following will describe operation procedures concerning the wake-up functions of the computer 10 by referring to FIG. 4, FIG. 5 and FIG. 6.

FIG. 4 shows a flowchart depicting the flow in environment setting for operating the wake-up function.

The set-up module 202 of the BIOS 107 displays a screen to designate the device of which the function to generate the wake-up signal is enabled (Block A1), and informs the device designated on the screen to the EC/KBC 113 (Block A2). The EC/KBC 113 stores the informed content in the nonvolatile memory 252 (Block A3), and issues a command for enabling the function to generate the wake-up signal (Block A4). The designated device which has received the command stores the information indicating that the function of generating the wake-up signal has been made effective in each of the nonvolatile memories 251*a*, 251*b*, 251*c* (Block A5).

FIG. 5 shows a flowchart depicting the flow of operations regarding the wake-up function of the EC/KBC 113 in returning to the status $G_3$.

When the power supply is restarted after returning to the status $G_3$, the EC/KBC 113 refers to the nonvolatile memory 252 and recognizes the specified device of which the function to generate the wake-up signal is made effective (Block B1). The EC/KBC 113 immediately starts the power supply to the recognized and specified device (Block B2).

FIG. 6 shows a flowchart depicting the flow of operations regarding the wake-up function of each device when the power supply is started.

Upon staring the power supply, each device refers to each of the nonvolatile memories 251*a*, 251*b*, 251*c* (Block C1), and checks whether or not the device itself is the designated device of which the function to generate the wake-up signal is enabled (Block C2). Starting power supply means that the information indicating that the device is the designated device is stored in the nonvolatile memory 252 of the EC/KBC 113, and then, each device performs the checking in consideration the case in which the power supply is started, for example, due to the retuning to the power-on status through the operation of the power button 14.

If the device is the designated device (YES in Block C2), after executing initialization including the procedure to enable the function of generating the wake-up up signal, each device monitors the occurrence of the predetermined event generating the wake-up signal (Block C3), and if each device detects the occurrence of the predetermined event (YES in Block C4), generates the wake-up signal (Block C5).

In this way, the computer 10 achieves the automatic returning to the power-on status by means of the wake-up function even in status $S_X'$.

By the way, while the embodiment has been described the example in which each device (LAN controller 108, wireless LAN controller 112 and USB controller 111) respectively includes the nonvolatile memories 251*a*, 251*b*, 251*c* for storing the information indicating whether the function of generating the wake-up signal is enabled, the EC/KBC 113 may issue the command for making the function of generating the wake-up signal effective when starting the power supply to the designated device of the which the function to generate the wake-up signal is enabled in returning to the status $G_3$ without including the nonvolatile signal in each device in consideration that the EC/KBC 113 includes the nonvolatile memory 252 which stores the equivalent information.

While the embodiment has been described the example in which the set-up module 202 is disposed in the BIOS 107, the invention is not limited to the embodiment, the function which is equivalent to that of the set-up module 202 may be disposed in the OS 201 or a stationary-type service program providing an interface for environment setting to the user as a utility.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising a wake-up function of returning from a power-off status to a power-on status when a predetermined event occurs in a power-off status, comprising:

a device comprising a function of generating a wake-up signal for enabling the wake-up function when the predetermined event occurs;

a controller configured to control power supply to modules of the information processing apparatus, and to return the information processing apparatus to the power-on status in response to the wake-up signal generated by the device;

a first nonvolatile memory configured to store information indicating whether the function of generating the wake-up signal should be enabled;

an initialization module configured to initialize the device in such a manner as to enable the function of generating the wake-up signal, if the information stored in the first nonvolatile memory indicates that the function of generating the wake-up signal is set to be enabled when the power supply is started;

a second nonvolatile memory configured to store information indicating devices for which the function of generating the wake-up signal is to be enabled; and a wake-up controller configured to start the power supply to the devices indicated in the information stored in the second nonvolatile memory when the power supply to the information processing apparatus is started, and to continue the power supply to the device in the power-off status, wherein the first nonvolatile memory is in the device, and the second nonvolatile memory is in the controller.

2. The information processing apparatus of claim 1, further comprising a set-up module configured to set whether the function of generating the wake-up signal should be enabled for the device.

\* \* \* \* \*